United States Patent
Dong et al.

(10) Patent No.: US 11,227,349 B2
(45) Date of Patent: Jan. 18, 2022

(54) METHODS AND SYSTEMS FOR GRAPH-BASED CROSS-DOMAIN RESTAURANT RECOMMENDATION

(71) Applicant: Visa International Service Association, San Francisco, CA (US)

(72) Inventors: Xiaobo Dong, Champaign, IL (US); Javid Ebrahimi, Mountain View, CA (US); Wei Zhang, Fremont, CA (US); Liang Wang, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/689,932

(22) Filed: Nov. 20, 2019

(65) Prior Publication Data
US 2021/0150646 A1    May 20, 2021

(51) Int. Cl.
*G06Q 50/12*  (2012.01)
*G06N 3/04*  (2006.01)
*G06Q 30/06*  (2012.01)
*G06Q 30/02*  (2012.01)

(52) U.S. Cl.
CPC .............. *G06Q 50/12* (2013.01); *G06N 3/04* (2013.01); *G06Q 30/0631* (2013.01); *G06Q 30/0282* (2013.01)

(58) Field of Classification Search
CPC ................ G06Q 30/0282; G06Q 30/0631
See application file for complete search history.

(56) References Cited

U.S. PATENT DOCUMENTS 10,909,553 B1 *   2/2021   Schulte .............. G06Q 30/0201
2015/0220835 A1 *  8/2015   Wilson ............... G06Q 30/0282
                                                        706/46

OTHER PUBLICATIONS

Linden et al., Amazon.com Recommendations. IEEE Industry Report, pp. 76-80; Jan.-Feb. 2003.
Grover et al., node2vec: Scalable feature learning for networks. In Proceedings of the 22nd ACM SIGKDD international conference on Knowledge discovery and data mining, pp. 855-864. ACM, 2016.
Hamilton et al., Inductive representation learning on large graphs. In Advances in Neural Information Processing Systems, pp. 1024-1034, 2017.

(Continued)

*Primary Examiner* — A. Hunter Wilder
*Assistant Examiner* — Hunter Wilder
(74) *Attorney, Agent, or Firm* — Schwabe Williamson & Wyatt, PC

(57) ABSTRACT

Methods and systems are described. A method includes accessing transaction data related to restaurants associated with a plurality of geographically separate locations, determining a number of co-visitors shared by each of the restaurants associated with the plurality of geographically separate locations above a predetermined threshold, generating a graphical representation of the plurality of restaurants based on the number of the co-visitors shared by restaurants with the co-visitors above the predetermined threshold and the distance between the restaurants with the co-visitors. The graphical representation is transformed into restaurant embeddings and a neural network model is used to generate restaurant preferences based on the restaurant embeddings.

17 Claims, 10 Drawing Sheets

(56) References Cited

OTHER PUBLICATIONS

Cantador et al., Cross-domain recommender systems, 8th ACM Conference on Recommender Systems, Foster City, CA, Oct. 6-10, 2014.
Wu et al., Graph convolutional matrix completion for bipartite edge prediction. In KDIR, pp. 49-58, 2018.
Perozzi et al., Deepwalk: Online learning of social representations. In Proceedings of the 20th ACM SIGKDD International conference on Knowledge discovery and data mining, pp. 701-710. ACM, 2014.
Sarwar et al., Item-based collaborative filtering recommendation algorithms. WWW 10:285-295, May 1-5, 2001, Hong Kong; ACM 1-58113-348-0/01/0005.

* cited by examiner

| UDUPI | | San Francisco area |
|---|---|---|
| Query result | Similarity Score | City |
| PARUS | 0.637474731 | Los Angeles area |
| ANAR INDIAN RESTAURANT | 0.496265938 | Los Angeles area |
| CHANDNI VEGETARIAN REST | 0.488406134 | Los Angeles area |
| SAMOSA HOUSE | 0.410342307 | Los Angeles area |
| HMSHOST | 0.403525165 | Los Angeles area |
| INDIAS RESTAURANT | 0.366910055 | Los Angeles area |
| SAGE VEGAN BISTRO | 0.361196231 | Los Angeles area |
| ANNAPURNA GRILL | 0.344691709 | Los Angeles area |
| RADHE SWEETS CATERING | 0.343671961 | Los Angeles area |
| SHOJIN | 0.289426316 | Los Angeles area |

Table 1: Query result for Indian restaurant UDUPI

| PINGS BISTRO | | San Francisco area |
|---|---|---|
| Query result | Similarity Score | City |
| KANG HODONG BAEKJEONG | 1.686834237 | Los Angeles area |
| SUN NONG DAN | 1.413188104 | Los Angeles area |
| QIN WEST CHINESE CUISINE | 0.948691744 | Los Angeles area |
| FENG MAO II | 0.880735639 | Los Angeles area |
| TASTY ZONE | 0.805927639 | Los Angeles area |
| QIN WEST NOODLE | 0.792333394 | Los Angeles area |
| SHUN EXPRESS | 0.764806082 | Los Angeles area |
| SICHUAN IMPRESSION | 0.671777001 | Los Angeles area |
| NOODOLOGY | 0.661150948 | Los Angeles area |
| SPICY KING CHINESE RESTA | 0.624447392 | Los Angeles area |

Table 2: Query result for Chinese restaurant PINGS BISTRO

| ARABIAN NIGHTS | | San Francisco area |
|---|---|---|
| Query result | Similarity Score | City |
| NUBIA CAFE | 1.013320281 | Los Angeles area |
| ALDEWANIAH RESTAURANT & | 0.760019641 | Los Angeles area |
| CAIRO RESTAURANT CAFE | 0.64406645 | Los Angeles area |
| 9 SOCIETY | 0.641157334 | Los Angeles area |
| NARA BISTRO | 0.570464116 | Los Angeles area |
| ALEPPOS KITCHEN | 0.539799128 | Los Angeles area |
| THE AMBROSE FB | 0.524826085 | Los Angeles area |
| SSAL KOREAN BBQ | 0.484710935 | Los Angeles area |
| EL MAHROOSA CAFE & HOOKAH | 0.478285507 | Los Angeles area |
| ROSE CAFE | 0.440346845 | Los Angeles area |

Table 3: Query result for Mediterranean restaurant ARABIAN NIGHTS

FIG. 1F

METHODS AND SYSTEMS FOR GRAPH-BASED CROSS-DOMAIN RESTAURANT RECOMMENDATION

TECHNICAL FIELD

Embodiments of the disclosure pertain to cross-domain item recommendation and, in particular, graph-based cross-domain item recommendation.

TECHNOLOGY BACKGROUND

A recommender system employs users' historical data to improve customer experience. It predicts a score between a user and a candidate item which the user has never seen before. Thereafter, the items with the highest scores are provided as recommendations to the user.

Recommender systems are built using users' past preferences as feedback. Explicit feedback includes cases, wherein a user gives feedback in the form of an evaluation of an item, e.g., rating 5 to indicate that a user likes an item very much, and rating 1 to indicate that a user dislikes an item. Implicit feedback includes cases wherein a mere interaction between a user and an item is provided, without a rating score, such as a visit to a restaurant.

In a cross-domain recommender system, the system has access to users' preferences in one domain, e.g., movies, and recommends items from a different domain, e.g., books. Providing a restaurant recommendation service to a traveler is an example of cross-domain recommendation. For instance, such a cross-domain restaurant recommendation system needs to be able to recommend a restaurant in Los Angeles to a traveler from San Francisco.

BRIEF DESCRIPTION OF THE DRAWINGS

FIG. 1F show tables that include query results for different types of cuisines according to an embodiment.

DESCRIPTION OF THE EMBODIMENTS

The embodiments described herein are not intended to be limited to the specific forms set forth herein. The embodiments are intended to cover such alternatives, modifications, and equivalents that are within the scope of the appended claims.

The detailed description that follows includes numerous specific details such as specific method orders, configurations, structures, elements, and connections have been set forth. It is to be understood however that these and other specific details need not be utilized to practice embodiments. In other embodiments, well-known structures, elements, or connections have been omitted, or have not been described in a manner so as not to obscure this description.

Any reference within the specification to "one embodiment" or "an embodiment" is intended to indicate that a particular feature, configuration, structure, or characteristic described in connection with the embodiment is included in at least one embodiment of the present invention. The appearance of the phrase "in one embodiment" in different parts of the specification can refer to different embodiments. Embodiments described as separate or alternative embodiments are not mutually exclusive of other embodiments. Moreover, various features are described which may be included in some embodiments and not by others. In additions, some requirements for some embodiments may not be required for other embodiments.

In the following description, unless indicated otherwise terms such as "accessing" or "determining" or "transforming" or "generating" or the like, refer to the operations and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

As used herein the term "item" is intended to include but not be limited to various types of merchants such as restaurants. As used herein the term "domain" is intended to include but not be limited to various types of jurisdictions or locations such as cites, states, nations, etc. and can include various types of merchants.

Network Architecture

Figure 1A:
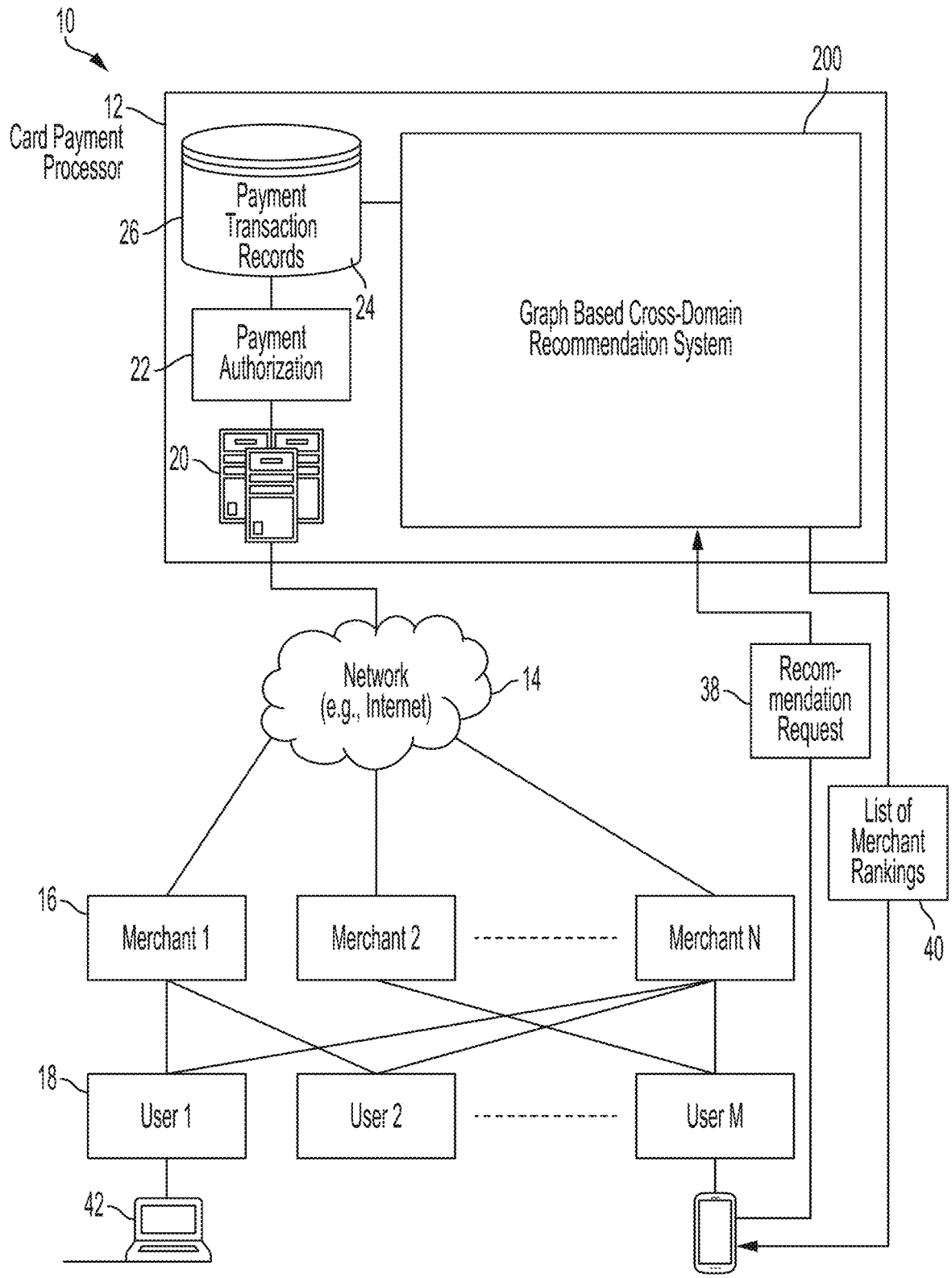
FIG. 1A shows a diagram of a card payment processing network architecture that includes a graph based cross-domain item recommendation system according to an embodiment.

FIG. 1A is a diagram of one embodiment of a card payment processing system in which the disclosed embodiments may be implemented. The card payment processing system 10 includes a card payment processor 12 in communication (direct or indirect) over a network 14 with a plurality of merchants 16. A plurality of cardholders or users 18 purchase goods and/or services from various ones of the merchants 16 using a payment card such as a credit card, debit card, prepaid card and the like. Typically, the card payment processor 12 provides the merchants 16 with a servicer or device that allows the merchants to except payment cards as well as to send payment details to the card payment processor over the network 14. In some embodiments, an acquiring bank or processor (not shown) may forward the credit card details to the card payment processor 12. Payment card transactions may be performed using a variety of platforms such as brick and mortar stores, ecommerce stores, wireless terminals, and mobile devices of the users. The payment card transaction details sent over the network 14 are received by one or more servers 20 of the payment card processor 12 and processed by, for example, a payment authorization process 22 and/or forwarded to an issuing bank (not shown). The payment card transaction details are stored as payment transaction records 24 in a transaction database 26. As is well known the servers 20 include memory and processors for executing software components as described herein.

The most basic and common type of payment card transaction data is referred to as a level 1 transaction. The basic data fields of a level 1 payment card transaction are: i) merchant name, ii) billing zip code, and iii) transaction amount. Additional information, such as the date and time of the transaction and additional cardholder information may be automatically recorded, but is not explicitly reported by the merchant 16 processing the transaction. A level 2 transaction includes the same three data fields as the level 1 transaction, and in addition, the following data fields may be generated automatically by advanced point of payment systems for level 2 transactions: sales tax amount, customer reference number/code, merchant zip/postal code tax id, merchant minority code, merchant state code.

In one embodiment, the payment processor 12 further includes a graph based recommendation system 200. The graph based recommendation system 200 generates recommendations based on embeddings generated from an item based graph that captures a similarity measure between restaurants. The graph based recommendation system 200 is capable of recommending any type of merchant, but for purposes of example, the graph based recommendation system 200 is described as providing recommendations to restaurant merchants, or simply restaurants.

The graph based recommendation system 200 mines the payment transaction records 24 to determine the number of co-visitors shared by the restaurants associated with a plurality of geographically separate locations above a predetermined threshold determined. An item based graphical representation of the restaurants is generated based on the number of co-visitors shared by restaurants that have co-visitors above the predetermined threshold (and based on the distance between the restaurants with co-visitors above the predetermined threshold). In an embodiment, an embedding system as is described herein is used to translate the item based graphical representation into embeddings which are used to learn the user preferences for merchants 16. The user preferences can be determined by a preference model, e.g., a deep neural network (DNN) classifier, and are based only on the payment transaction records 24 without any rating or review data or detailed metadata about the merchants/ restaurants.

In one embodiment where the merchant recommendations are for restaurants specifically, the recommendation may be provided in response to a recommendation request 38 by identifying restaurants within a particular region. Each pair of restaurants in the region can be compared for the user 18 by the preference model to determine which restaurant is preferred by the user 18. The graph based recommendation system 200 can then compute a ranked list of restaurants 39 in the region based on the pairwise comparison results and transmit the ranked list of restaurants 39 to a device of the requesting user 18.

In an embodiment, the system 200 uses an item-based recommendation approach, wherein given a set of previously preferred items, the system recommends similar items. In an embodiment, a graph-based similarity metric is defined based on transactional data. In an embodiment, method used is non-parametric and may not require training. In an embodiment, at test time, the similarity of items are used as the metric for recommendation. For example, given a set of lookup points, e.g., favorite previous restaurants, similar items for recommendation are identified in a queried location, X. In an embodiment, the graph-based model used by system 200 is scalable because the graph is based on restaurants where the number of nodes of the graph is in the order of at most hundreds of thousands. In other embodiments, the number of nodes of the graph can be greater or lesser than hundreds of thousands.

Graph Based Cross-Domain Recommendation System

Figure 1B:
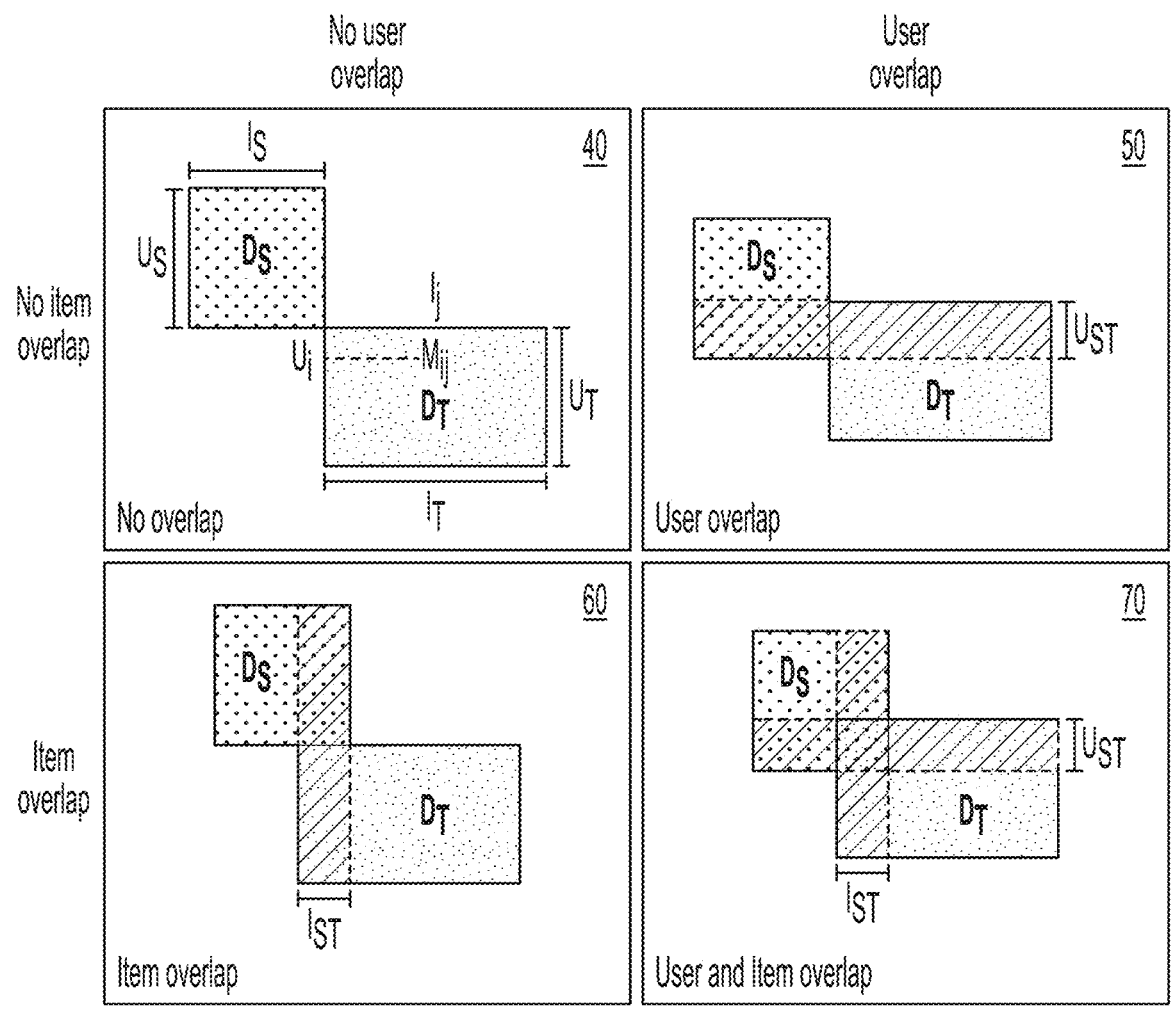
FIG. 1B shows a schematic that illustrates respective types of cross-domain conditions.
Figure 1C:
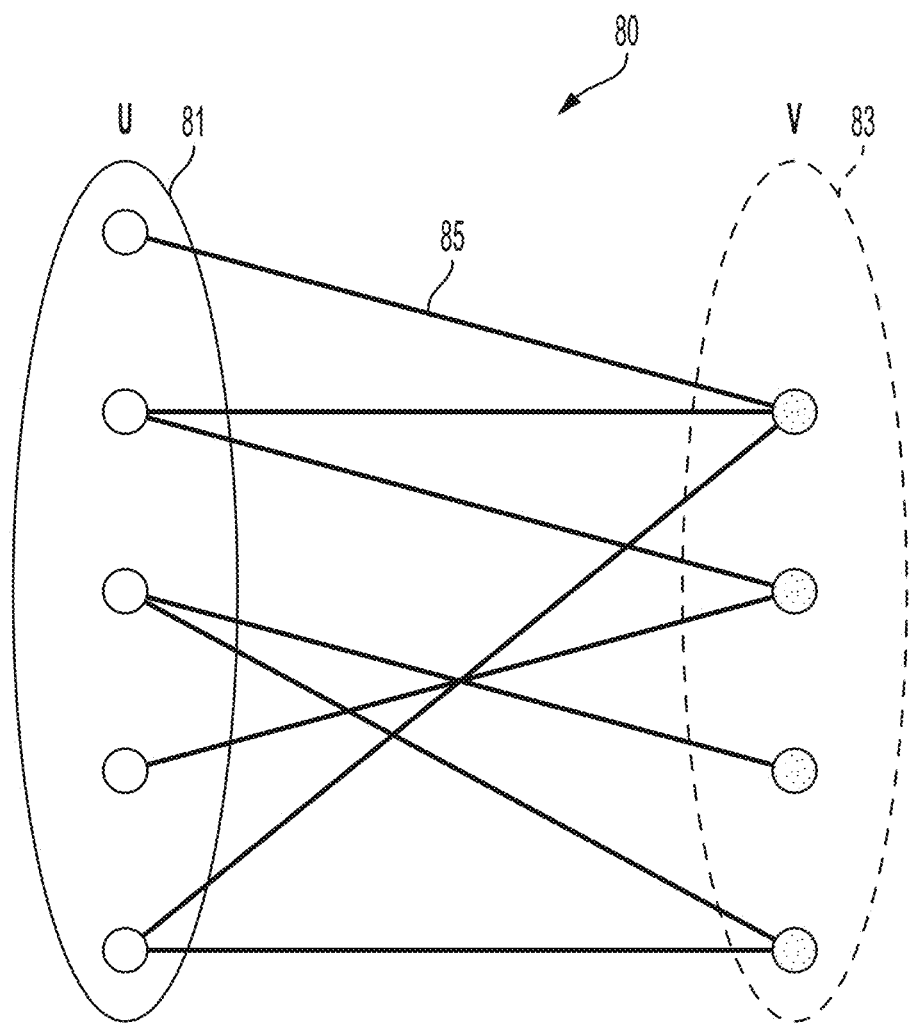
FIG. 1C shows an example bipartite graph.

Referring to FIG. 1A, as discussed above, the graph based recommendation system 200 generates recommendations based on embeddings generated from an item based graph that captures a similarity measure between restaurants. The item based graph used by system 200 is more scalable than user-item based graphs and does not have to be regenerated (can be updated periodically instead). FIGS. 1B and 1C respectively show a user-item based matrix and a user-item based bipartite graph. The user-item based matrix and the user-item bipartite graph are described below and contrasted with the item-item based graph of an embodiment that is described with reference to FIG. 1D

Referring to FIG. 1B, the user-item matrix includes four sets of user-item matrices 40, 50, 60 and 70 that represent different cross domain cases. Each set of user-item matrices 40, 50, 60 and 70 includes a matrix $D_S$ that corresponds to a domain S and a matrix $D_T$ that corresponds to a domain T. In FIG. 1B, the rows and columns of each matrix represent users and items respectively. The hatched regions indicate user opinions on those items, and the unhatched regions indicate that users have never interacted with those items. An entry $m_{ij}$ at row i and column j of the matrix $D_T$ (corresponding to the domain T) represents a user i's evaluation of an item j. Conventionally, with respect to evaluation, a value 0 on a scale of 0 to 5 in $m_{ij}$ indicates that user i has never seen item j; values 5 to 1 indicate a degree of interest from very satisfied to very dissatisfied. In one approach, the user-item matrix can be used for explicit feedback recommendation. However, for implicit feedback recommendation a 0-1 matrix can be used to represent the user-item relationship. If a user has never interacted with an item, the corresponding value is 0, and is 1 otherwise.

FIG. 1C shows a bipartite graph 80 that can be used to model cross domain cases such as are shown in FIG. 1B. Referring to FIG. 1C, the vertices 81 on the left side of the graph represent users, U, and the vertices 83 on the right of side the graph represent items, V. The lines that extend between the vertices 81 and 83 are termed "edges" 85. The weight of an edge 85 that extends between vertices 81 and 83 can represent a user's evaluation of items in an explicit feedback recommendation setting. The use of a bipartite graph such as bipartite graph 80 for cross-domain recommendations has drawbacks as is discussed below with regard to FIG. 1D.

Figure 1D:
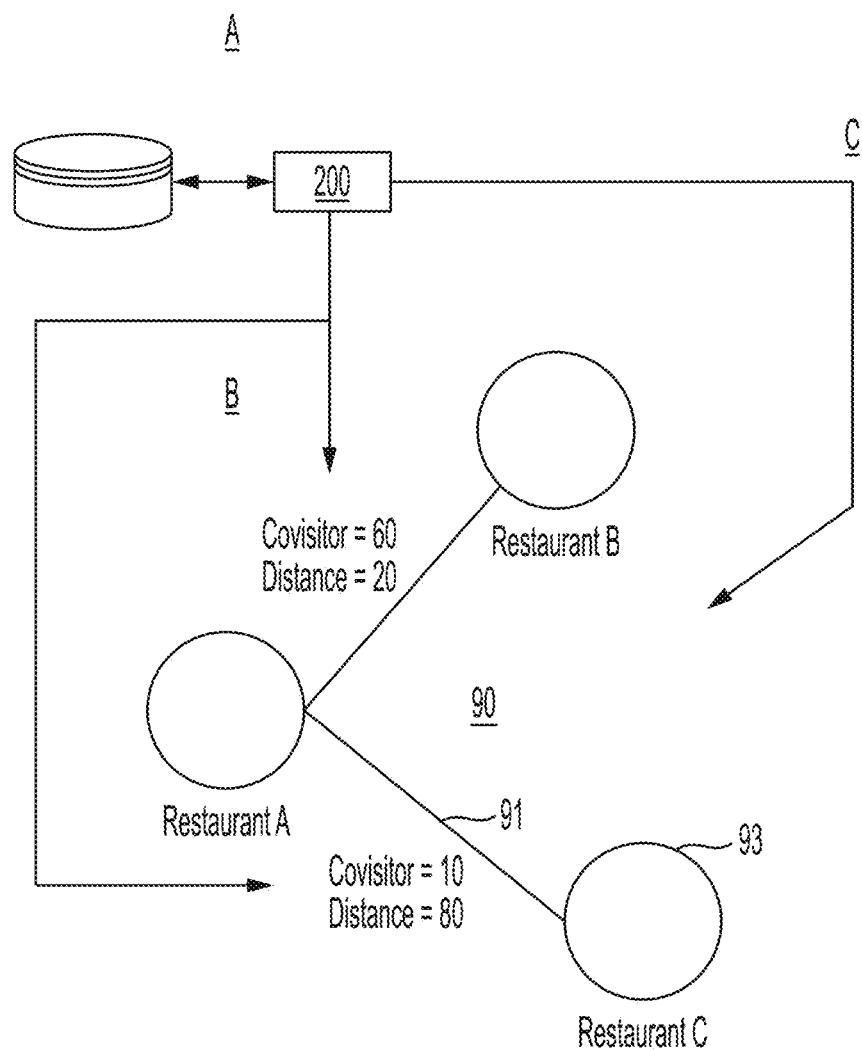
FIG. 1D shows a graph that is used for cross-domain recommendation according to an embodiment.

FIG. 1D shows an item-item based graph 90 (as opposed to the user-item based schematics FIGS. 1B and 1C) that can be used to model cross domain recommendation according to an embodiment. In an embodiment, the item-item based graph 90 can be used to model cross domain recommendation when there is no item-overlap and there is user-overlap. In addition, the item-item based graph 90 uses implicit user feedback from user transaction records, and operates without relying on a user's perception of their purchase. An example of the no item-overlap/user-overlap situation can be encountered by restaurant recommendation services when endeavoring to make a cross-domain recommendation of a restaurant to a traveler. As used herein "a cross-domain recommendation" can include but is not limited to cross-city recommendations. For example, where a recommendation is made for a New York City restaurant to a traveler who is from San Francisco. Cross-domain recommendations can also include cross-border recommendations, e.g., for travelers visiting different countries.

Referring to FIG. 1D, the edges 91 extending between graphical representations of restaurants 93 represent the number of co-visitors that are shared among items or restaurants and the distance between restaurants. In an embodiment, the edges 91 provide a mutual information metric that is based on restaurant transactions. In an embodiment, the item-item based graph 90 is configured to capture similarities among restaurants. In an embodiment, the similarity is not biased towards proximal restaurants, but instead, to capture semantic similarities, such as cuisine type. In an embodiment, the item-item based graph 90 uses historical data to determine a score for a user and a candidate item which the user has never seen before. In the context of restaurant recommendation, an important business requirement is to recommend a restaurant to a traveler, for whom no or few restaurant visits in that location exists. In an embodiment, a graph is produced based on restaurant transactions, in which an edge extends between restaurants with more than a few co-visitors. In an embodiment, the edge weights are normalized based on the proximity of the restaurants and their total number of visits. In an embodiment, the item-item based graph 90 captures the similarity between restaurants, such as their type of cuisine, even if they are in different cities. In an embodiment, the similarity measure can be used to make similarity-based item recommendations that are based on a user's history of restaurant interactions.

In an embodiment, the item-item based graph 90 is constructed from a users' transactional data. In an embodiment, each node 93 represents an item or restaurant, and the weight of an edge 91 between nodes is based on the number of common users (co-visitors). If a user visits both restaurants twice, the visits contribute "1" to the weight of the edge. In an embodiment, weight is designed to accumulate based on the number of users, and not the transaction volume, in order to reduce popularity bias. In this manner, the edges between popular restaurants are prevented from accumulating excessively large weights that can operate to skew the graph-based model. In addition, each edge incorporates the geographical distance between two restaurants.

FIG. 1D provides a straightforward example involving three restaurants that illustrates the manner in which restaurants, common visitors and distance between restaurants are graphically represented according to an embodiment. For example, FIG. 1D shows that restaurants A and B have had 60 common visitors (over a certain period of time) and that there's a geographical distance of about 20 miles between them. Restaurant B and restaurant C have no common visitors (or the number of common visitors is less than a pre-defined threshold), so there is no edge between them.

In an embodiment, based on the item-item based graph 90, a metric related to the mutual information between respective restaurants can be defined as following: mutual information between A and B=(covisitor$^2$/(total user in A×total user in B)×distance$^\alpha$)$^{0.5}$. In an embodiment, the mutual information metric determines restaurant similarity based on a users' behavior without relying upon a collection of user profiles or restaurant profiles. In an embodiment, the alpha in the mutual information equation is designed to address cross-domain recommendations. In an embodiment, when alpha is 0, the similarity is determined by the number of common visitors and a local restaurant recommendation is made. However, when alpha is greater than 1, the similarity is determined by both the number of common visitors and the geographical distance between the restaurants. For example, people who like Chinese food have a high probability to eat Chinese food during travelling. In this sense, when alpha is large, the mutual information operates to capture the similarity across cities. In an embodiment, the mutual information is built into the graph and thus reflected in the embeddings that are derived therefrom and used by system 200 to make recommendations.

In an embodiment, the item-item based graph 90 is more scalable than user-item based graphs such as described with reference to FIG. 1C. For example, because the item-item based graph 90 is an item based graph, it has only V nodes, as opposed to the V*U nodes, of a user-item graph. In addition, the item-item based graph 90 only has to be generated once. For example, instead of being regenerated in response to the recording of new transaction data, the graph can be updated periodically.

Operation

Generating Item Based Graphs and Embeddings

Referring again to FIG. 1D, at operation A, transaction data related to restaurants associated with a plurality of geographically separate locations is collected. In an embodiment, the transaction data can be accessed from payment transaction records. It should be appreciated that the transaction data can involve millions of transactions and restaurants located in cities of different countries, jurisdictions and locales.

At operation B, the number of co-visitors shared by the restaurants associated with the plurality of geographically separate locations above a predetermined threshold is determined. In an embodiment, the number of co-visitors can be determined by reviewing the payment transaction records associated with the restaurants and identifying restaurants that have shared visitors. The number of these visits can then be counted.

At operation C, a graphical representation (e.g., 90) of the plurality of restaurants is generated based on the number of co-visitors shared by restaurants with co-visitors above the predetermined threshold and the distance between the restaurants with co-visitors. In an embodiment, the graphical representation is an item-item based graph (as opposed to the user-item based graph of FIG. 1C) that can be used to model cross domain recommendation when there is no item-overlap and there is user-overlap. In an embodiment, the graph is constructed from a users' transactional data. In an embodiment, each node represents an item or restaurant, and the weight of an edge of between nodes represents the number of common users (co-visitors). In addition, each edge incorporates the geographical distance between two restaurants (see mutual information equation).

Figure 1E:
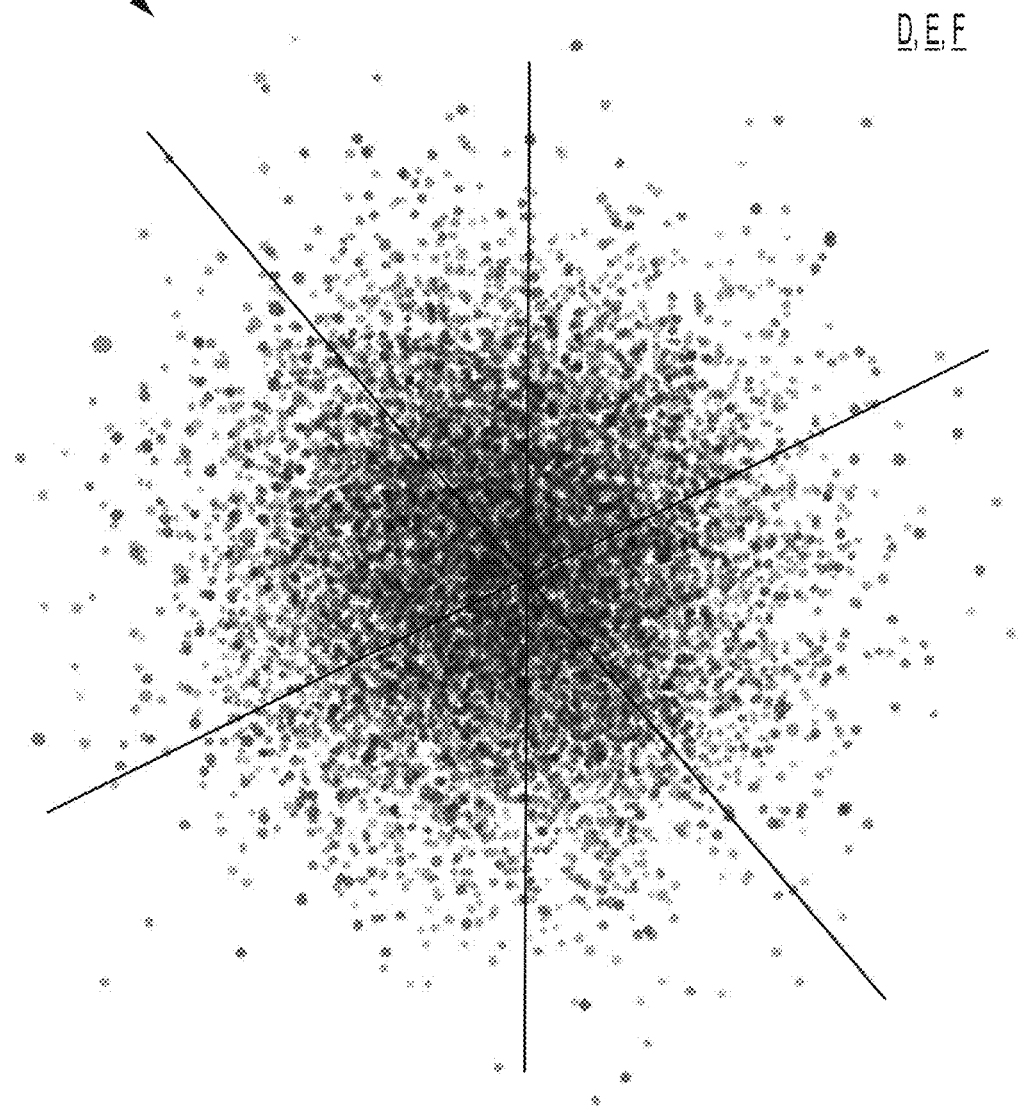
FIG. 1E is a schematic that provides a visual representation of graph embeddings that are used for cross-domain recommendation according to an embodiment.

Referring to FIG. 1E at operation D, the graphical representation is transformed into restaurant embeddings and a neural network model is used to generate restaurant recommendations based on the restaurant embeddings. In an embodiment, the graph features can be turned into restaurant embeddings and a neural network model can be used to generate restaurant recommendations based on the embeddings using systems that include but are not limited to DeepWalk or node2vec.

FIG. 1E shows graph embeddings 80 according to an embodiment. In an embodiment, the graph embeddings 80 shown in FIG. 1E are not separable by domain (e.g., location). This indicates that the embeddings that are produced can be used for cross-domain (e.g., geographic) recommendation because they are not biased by the location a person frequently transacts in. In an embodiment, Deep-Walk, a graph embedding system, can be used to generate restaurant embeddings. In other embodiments, other graph embedding systems can be used to generate restaurant graph embeddings. In an embodiment, a matrix factorization technique, principal component analysis (PCA) can be used for dimension reduction for data visualization. In other embodiments, other matrix factorization techniques, can be used for dimension reduction for data visualization. As shown, the data which corresponds to San Francisco and Los Angeles restaurants merge together into one cluster. In this sense, the restaurant embedding is location independent and can be used in deep learning recommendation models.

Restaurant Recommendation

Referring to FIG. 1E, at operation E a user's restaurant preferences in a first domain (e.g., San Francisco) are determined based on the embeddings determined at D. At F, based on the preferences determined using the embeddings 80, restaurants in a second domain (e.g., Los Angeles) similar to the user's restaurant preferences in the first domain are identified. In an embodiment, the similarity metric is used to compute a similarity score among all pairs of restaurants in the set of restaurants in the first domain and the set of restaurants in the second domain. In an embodiment, the scores are used to determine recommendations. An exemplary algorithm for using scores to determine recommendations is provided as follows:

Example Algorithm for Recommendation Based on Mutual Preference

Input: Set of N most-frequently-visited restaurants by a user, R1,
Set of M most popular restaurants in an area, R2.
Output: Top K of Sim[1 . . . M]
for i=1, . . . , N do
for j=1, . . . , M do
Sim[j]←Sim[j]+Score(R1[i], R2[j])

The foregoing algorithm is only exemplary. In other embodiments, other algorithms can be used. In an embodiment, the system 200 can provide as recommendations a ranked list of restaurants in the second domain as described with reference to FIG. 1F.

FIG. 1F illustrates the capacity of the described item-based graph to capture similar restaurants across cities. In FIG. 1F, recommendation requests for Indian, Chinese, and Mediterranean restaurants were made. The requests resulted in the random selection of three restaurants in the San Francisco area: Udupi, Pings Bistro and Arabian Nights, corresponding to the three types of requested restaurants. For each of the three restaurants, the top 10 similar restaurants in the Los Angeles area, were generated by system 200 as listed in tables 1, 2, and 3.

In an embodiment, a plurality of techniques can be used to generate recommendations using the item-based graph. In an embodiment, as described herein, recommendations can be generated by turning the graph features into restaurant embeddings and using a neural network model to generate restaurant recommendations therefrom. For example, systems that include but are not limited to DeepWalk or node2vec can be used to turn item based graph features into network embeddings. Thereafter, a neural network model can be used based on the embeddings.

Figure 1G:
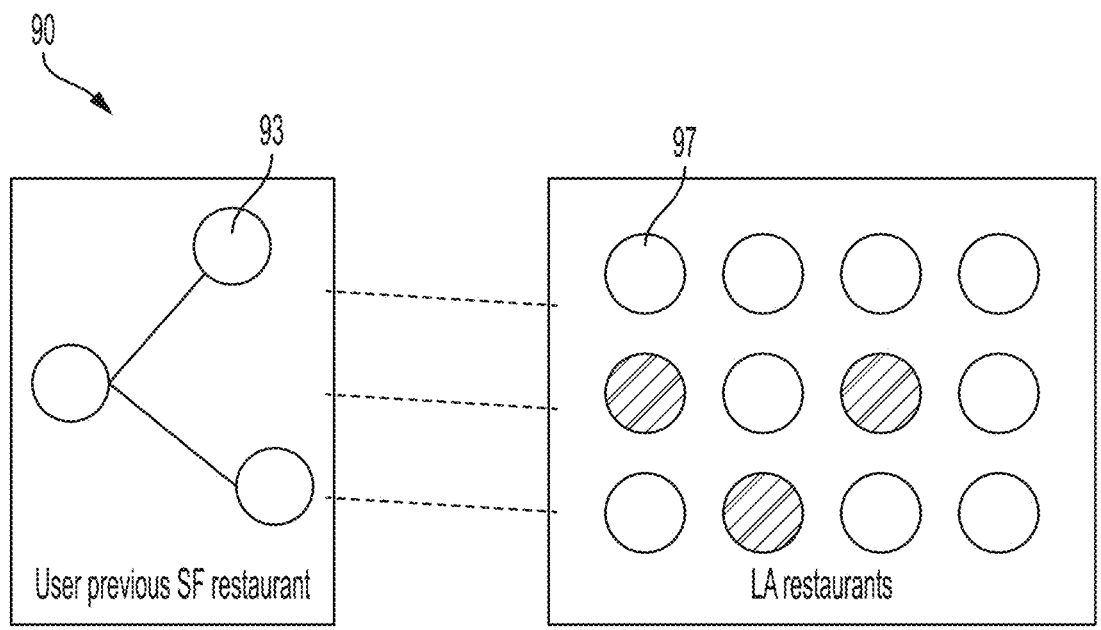
FIG. 1G illustrates operations in a graph based cross-domain item recommendation example according to an embodiment.

In an embodiment, another manner of generating recommendations using an item-based graph, is to build a recommendation model based on the item-based graph with graph KNN (k-nearest neighbors), based on the mutual information metric. In this embodiment, each user is represented by the restaurants that they have visited. In an embodiment, a decay factor is assigned to each restaurant given by the time, e.g., the more recent the restaurant visit, the more impact that the visit has on a recommendation. FIG. 1G illustrates the operation of a recommendation model based on the item-item based graph 90 using KNN(k-nearest neighbors). Referring to FIG. 1G, if a user is a San Francisco resident who has traveled to Los Angeles, and needs local restaurant recommendations, system 200 can use that user's past restaurant history to represent the user by the restaurant nodes 93 on the graph 90. Thereafter, the KNN recommendation model can find the closest neighbors 97 in Los Angeles on the restaurant graph as is shown in FIG. 1G.

Components of Graph Based Cross-Domain Recommendation System

Figure 2:
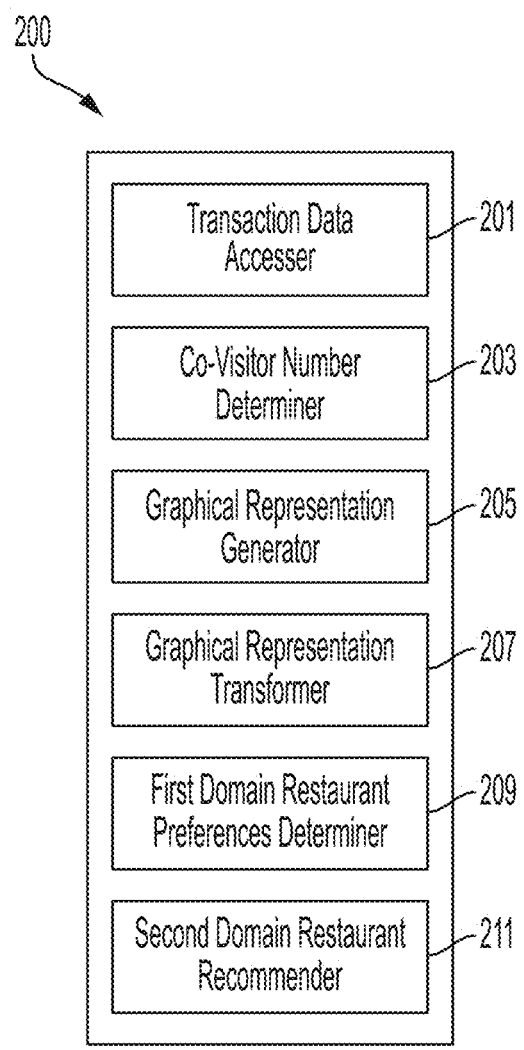
FIG. 2 shows the components of a graph based cross-domain item recommendation system according to an embodiment.

FIG. 2 shows components of system 200 according to an embodiment. In the FIG. 2 embodiment, system 200 includes transaction data accesser 201, co-visitor number determiner 203, graphical representation generator 205, graphical representation transformer 207, first domain restaurant preferences determiner 209 and second domain restaurant recommender 211.

Referring to FIG. 2, the transaction data accesser 201 accesses transaction data related to restaurants associated with a plurality of geographically separate locations. In an embodiment, the transaction data can be accessed from payment transaction records.

Co-visitor number determiner 203 determines the number of co-visitors shared by each of the restaurants associated with the plurality of geographically separate locations above a predetermined threshold. In an embodiment, the number of co-visitors can be determined by reviewing the payment transaction records associated with the restaurants and identifying restaurants that have shared visitors.

Graphical representation generator 205 generates a graphical representation of the plurality of restaurants based on the number of co-visitors shared by restaurants with co-visitors above the predetermined threshold and the distance between the restaurants with co-visitors. In an embodiment, the graphical representation is an item-item based graph (as opposed to the user-item based graphs of FIG. 1C) that can be used to model cross domain recommendation when there is no item-overlap and there is user-overlap. In an embodiment, the graph is constructed from a users' transactional data. In an embodiment, each node represents an item or restaurant, and the weight of an edge between nodes represents the number of common users (co-visitors). In addition, each edge incorporates the geographical distance between two restaurants.

Graphical representation transformer 207 transforms the graphical representation into restaurant embeddings such that a neural network model can be used to generate restaurant preferences based on the restaurant embeddings. In an embodiment, the graph features can be turned into restaurant embeddings and a neural network model can be used to generate restaurant preferences using systems that include but are not limited to DeepWalk or node2vec.

First domain restaurant preferences determiner 209 determines a user's restaurant preferences in a first domain (e.g., San Francisco) based on the embeddings. In an embodiment, the first domain restaurant preferences determiner 209 can include a neural network model that can use the embeddings that are generated by graphical representation transformer 207 to determine the user's restaurant preferences. In an embodiment, from the user's restaurant preferences, the user's restaurant preferences in the first domain can be determined.

Second domain restaurant recommender 211, based on the preferences, restaurants in a second domain (e.g., Los Angeles) similar to the user's restaurant preferences in the first domain are identified. For example, second domain restaurant recommender 211 can compute a ranked list of restaurants in the second domain that is based on a determination of restaurant similarity.

FIG. 2 illustrates an example manner of implementing the system 200 of FIG. 1A. In an embodiment, one or more of the elements, processes, components and/or devices of the system 200 may be integrated, separated, re-arranged, omitted, eliminated and/or implemented in other manners. In an embodiment, the components of system 200 can be implemented using hardware, software, firmware and/or any combination thereof. In particular, components of system 200 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). In an embodiment, as regards software and/or firmware implementation of the system 200, at least one of the components of such is/are hereby expressly defined to include a non-transitory computer readable storage device or storage disk such as a memory, a digital versatile disk (DVD), a compact disk (CD), a Blu-ray disk, etc. including the software and/or firmware. It should be appreciated that, the example system 200 can include one or more elements, processes and/or devices in addition to, or instead of, those illustrated in FIG. 2, and/or may include more than one of any or all of the illustrated elements, processes and devices.

Figure 3:
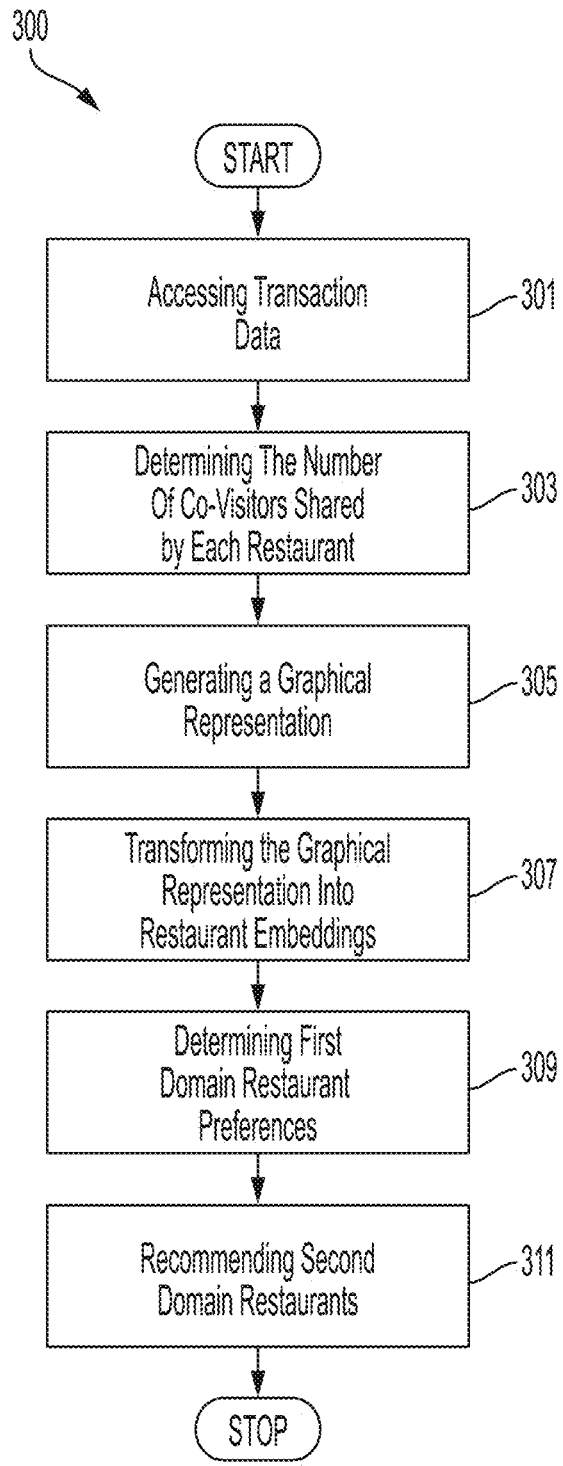
FIG. 3 shows a flowchart of a method for graph based cross-domain item recommendation according to an embodiment.

FIG. 3 is a flowchart 300 of a method for graph based recommendation according to an embodiment. Referring to FIG. 3, the method includes at 301, accessing transaction data related to restaurants associated with a plurality of geographically separate locations. At 303, determining the number of co-visitors shared by each of the restaurants associated with the plurality of geographically separate locations above a predetermined threshold. At 305, generating a graphical representation of the plurality of restaurants based on the number of co-visitors shared by restaurants with co-visitors above the predetermined threshold and the distance between the restaurants with co-visitors. At 307, transforming the graphical representation into restaurant embeddings and using a neural network model to generate restaurant preferences based on the restaurant embeddings. At 309, determining first domain restaurant preferences. At 311, based on the preferences, recommending second domain restaurants.

In an embodiment, the operations of the flowchart 300 can correspond to machine readable instructions of a program that can be executed by a processor of a computer system 200 such as is discussed with regard to FIG. 4 below. In some embodiments, the program and/or portions or parts thereof can be executed by a device other than a processor. The program can be stored on a non-transitory machine or computer readable storage medium such as a hard drive, a digital versatile disk (DVD), a read-only memory, a compact disk, a floppy disk, a Blu-ray disk, a cache, a random-access memory or other storage device. As used herein, the term non-transitory computer readable medium is intended to refer to computer readable storage devices and/or storage disks and to exclude propagating signals and to exclude transmission media. In some embodiments, the program can be embodied in firmware or dedicated hardware. In an embodiment, one or more of the operations of the flowchart can be performed without executing software or firmware. For example, one or more of the blocks may be implemented by one or more hardware circuits such as a Field Programmable Gate Array (FPGA), an Application Specific Integrated circuit (ASIC), a discrete and/or integrated analog and/or digital circuit, a comparator, an operational-amplifier (op-amp), a logic circuit, etc. It should be noted that the order of execution of the blocks of the flowchart of FIG. 3 may be changed. In addition, one or more of the blocks of the flowchart can be eliminated or added.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device. Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Figure 4:
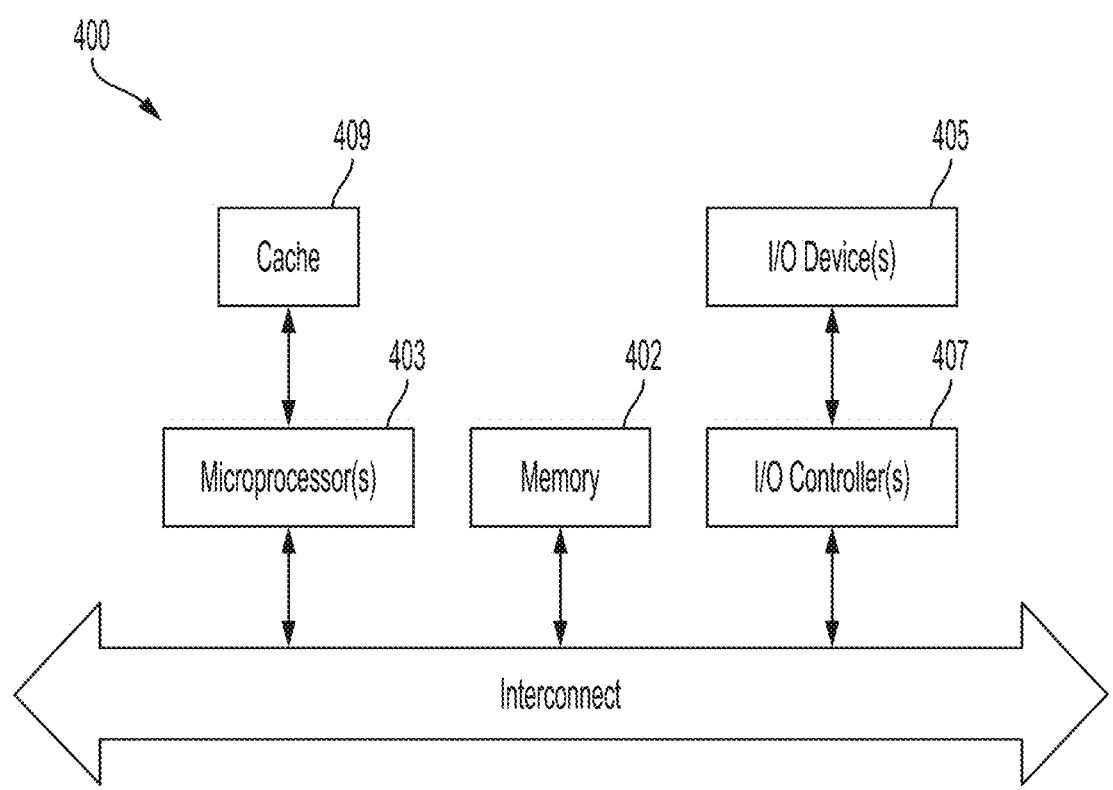
FIG. 4 shows a schematic of a computer system according to an embodiment.

FIG. 4 shows a computer system 400 according to an embodiment. The computer system 400 can include a microprocessor(s) 403 and memory 402. In an embodiment, the microprocessor(s) 403 and memory 402 can be connected by an interconnect 401 (e.g., bus and system core logic). In addition, the microprocessor 403 can be coupled to cache memory 409. In an embodiment, the interconnect 401 can connect the microprocessor(s) 403 and the memory 402 to input/output (I/O) device(s) 405 via I/O controller(s) 407. I/O devices 405 can include a display device and/or peripheral devices, such as mice, keyboards, modems, network interfaces, printers, scanners, video cameras and other devices known in the art. In an embodiment, (e.g., when the data processing system is a server system) some of the I/O devices 405, such as printers, scanners, mice, and/or keyboards, can be optional.

In an embodiment, the interconnect 401 can include one or more buses connected to one another through various bridges, controllers and/or adapters. In one embodiment, the I/O controllers 407 can include a USB (Universal Serial Bus) adapter for controlling USB peripherals, and/or an IEEE-1394 bus adapter for controlling IEEE-1394 peripherals.

In an embodiment, the memory 402 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DV D RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of an application claiming priority to this provisional application to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method, the method comprising:
   accessing, by a computer system, payment transaction records from a transaction database of a payment processor, the payment transaction records related to restaurants associated with a plurality of geographically separate locations;
   determining, by the computer system, from the payment transaction records a number of co-visitors shared by each of the restaurants associated with the plurality of geographically separate locations above a predetermined threshold;
   generating, by the computer system, a graphical representation comprising a restaurant-restaurant based graph of the restaurants, wherein a plurality of nodes represent the restaurants and edges between the nodes represent the number of the co-visitors shared by the restaurants with the number of co-visitors above the predetermined threshold and the distance between the restaurants with the co-visitors, wherein the graphical representation is generated without explicit feedback;
   transforming, by the computer system, the graphical representation into restaurant embeddings reflecting a mutual information metric;
   generating, by a neural network model, restaurant preferences based on the restaurant embeddings;
   responsive to receiving, by the computer system, a recommendation request over a network from a device of a user, computing a ranked list of the restaurants based on the restaurant preferences; and
   transmitting, by the computer system, the ranked list of the restaurants over the network to the device of the user,
   wherein the mutual information metric is used to determine restaurant similarity based on a user's behavior without relying upon a collection of user profiles or restaurant profiles, wherein the restaurant similarity is determined b y either a number of common visitors between a pair of restaurants or by both the number of common visitors and a geographical distance between the pair of restaurants.

2. The method of claim 1, further comprising:
   determining the user's restaurant preferences in a first domain based on the embeddings; and
   based on the preferences, identifying restaurants in a second domain that are similar to the user's restaurant preferences in the first domain.

3. The method of claim 1, wherein a measure of similarity between restaurants is determined based on the number of co-visitors shared by the restaurants and the distance between the restaurants.

4. The method of claim 3, wherein the measure of similarity is tunable using a variable related to distance.

5. The method of claim 1, wherein the geographically separate locations are cities.

6. The method of dam 1, wherein the number of co-visitors is limited to a predetermined time period.

7. A non-transitory computer readable medium comprising computer readable instructions which when executed, cause a processor to at least:
   access by the processor, payment transaction records from a transaction database of a payment processor, the payment transaction records related to restaurants associated with a plurality of geographically separate locations;
   determine, by the processor, from the payment transaction records a number of co-visitors shared by each of the restaurants associated with the plurality of geographically separate locations above a predetermined threshold;
   generate, by the processor, a graphical representation comprising a restaurant-restaurant based graph of the restaurants, wherein a plurality of nodes represent the restaurants and edges between the nodes represent the number of the co-visitors shared by the restaurants with the number of co-visitors above the predetermined threshold and the distance between the restaurants with co-visitors, wherein the graphical representation is generated without explicit feedback;

transform, by the processor, the graphical representation into restaurant embeddings reflecting a mutual information metric;

generate, by a neural network model, restaurant preferences based on the restaurant embeddings;

responsive to receiving, by the processor, a recommendation request over a network from a device of a user, compute a ranked list of the restaurants based on the restaurant preferences; and transmit, by the processor, the ranked list of the restaurants over the network to the device of the user, wherein the mutual information metric is used to determine restaurant similarity based on a user's behavior without relying upon a collection of user profiles or restaurant profiles, wherein the restaurant similarity is determined by either a number of common visitors between a pair of restaurants or by both the number of common visitors and a geographical distance between the pair of restaurants.

8. The non-transitory computer readable medium of claim 7, further causing a processor to at least:

determine the user's restaurant preferences in a first domain based on the embeddings; and based on the preferences, identify restaurants in a second domain that are similar to the user's restaurant preferences in the first domain.

9. The non-transitory computer readable medium of claim 7, wherein a measure of similarity between restaurants is determined based on the number of co-visitors shared by the restaurants and the distance between the restaurants.

10. The non-transitory computer readable medium of claim 9, wherein the measure of similarity is tunable using a variable related to distance.

11. The non-transitory computer readable medium of claim 7, wherein the geographically separate locations are cities.

12. The non-transitory computer readable medium of claim 7, wherein the number of co-visitors is limited to a predetermined time period.

13. A device, comprising:

one or more processor components;

one or more data storage components, at least one of the one or more data storage components including instructions that when executed cause at least one of the one or more processor components to:

access transaction records from a transaction database of a payment processor, the transaction records related to restaurants associated with a plurality of geographically separate locations;

determine from the payment transaction records a number of co-visitors shared by each of the restaurants associated with the plurality of geographically separate locations above a predetermined threshold;

generate a graphical representation comprising a restaurant-restaurant based graph of the restaurants, wherein a plurality of nodes represent the restaurants and edges between the nodes represent the number of the co-visitors shared by the restaurants with the number of co-visitors above the predetermined threshold and the distance between the restaurants with the co-visitors, wherein the graphical representation is generated without explicit feedback; and transform the graphical representation into restaurant embeddings reflecting a mutual information metric:

generate, by a neural network model, restaurant preferences based on the restaurant embeddings;

responsive to receiving a recommendation request over a network from a device of a user, compute a ranked list of the restaurants based on the restaurant preferences; and transmit, by the computer system, the ranked list: o the restaurants over the network to the device of the user, wherein the mutual information metric is used to determine restaurant similarity based on a user's behavior without relying upon a collection of user profiles or restaurant profiles, wherein the restaurant similarity is determined by either a number of common visitors between a pair of restaurants or by both the number of common visitors and a geographical distance between the pair of restaurants.

14. The device of claim 13, further comprising, causing at least one of the one or more processor components to:

determine the user's restaurant preferences in a first domain based on the embeddings; and based on the preferences, identify restaurants in a second domain that are similar to the user's restaurant preferences in the first domain.

15. The device of claim 13, wherein a measure of similarity between restaurants is determined based on the number of co-visitors shared by the restaurants and the distance between the restaurants.

16. The device of claim 15, wherein the measure of similarity is tunable using a variable related to distance.

17. The device of claim 13, wherein the geographically separate locations are cities.

* * * * *